United States Patent [19]

McNutt

[11] Patent Number: 5,221,100
[45] Date of Patent: Jun. 22, 1993

[54] TRAILER FRAME WITH STABILIZED CASTER SWIVEL

[76] Inventor: Darrell A. McNutt, Highway 70 East, Rte. 1, Box 10, Soper, Okla. 74759

[21] Appl. No.: 915,080

[22] Filed: Jul. 16, 1992

[51] Int. Cl.⁵ ............................................. B62D 61/00
[52] U.S. Cl. ....................................... 280/78; 280/90; 280/271; 280/86; 16/35 D
[58] Field of Search ................... 280/78, 271, 272, 92, 280/89, 90, 86; 16/18, 35 D, 44

[56] References Cited

U.S. PATENT DOCUMENTS

| | | | |
|---|---|---|---|
| 1,896,234 | 2/1933 | Hathorn | 16/35 D |
| 3,075,233 | 1/1963 | Lorenz | 16/35 D |
| 4,154,451 | 5/1979 | Young | 280/86 |
| 4,212,093 | 7/1980 | Lombard | 280/271 |
| 4,410,194 | 10/1983 | Steilen | 280/86 |

FOREIGN PATENT DOCUMENTS

| | | | |
|---|---|---|---|
| 161607 | 9/1983 | Japan | 280/78 |
| 549772 | 12/1942 | United Kingdom | 16/35 D |
| 549773 | 12/1942 | United Kingdom | 16/35 D |

*Primary Examiner*—Margaret A. Focarino
*Assistant Examiner*—Kevin Hurley
*Attorney, Agent, or Firm*—John R. Flanagan

[57] ABSTRACT

A cargo trailer for towing behind another vehicle has a cargo container platform and a stabilized caster swivel assembly supporting the cargo container platform. The swivel assembly includes an elongated frame, a caster wheel on a swivel member being rotatably mounted about a vertical axis to a rear end of the frame, a cam member mounted on the swivel member for rotation therewith, a centering mechanism coupled to the cam member, a hydraulic stabilizing mechanism coupled to the swivel member, and a hydraulic control circuit mounted on the frame. The control circuit has a valve in flow communication with the hydraulic stabilizing mechanism and actuatable between a restricted flow position causing the stabilizing mechanism to resist movement of the caster wheel in either direction beyond maximum allowable angular limits away from a centered position aligned with a forward direction of travel and a second unrestricted flow condition allowing the stabilizing mechanism to permit movement of the caster wheel in either direction away from the centered position beyond the maximum limits. The trailer also has a bounce motion dampening assembly including an elongated spring connected at one end to the frame and an inelastic elongated flexible belt connected at one end to the spring and at an opposite end to the towing vehicle for transferring the load therefrom to the stabilizing swivel assembly frame.

16 Claims, 3 Drawing Sheets

TRAILER FRAME WITH STABILIZED CASTER SWIVEL

BACKGROUND OF THE INVENTION

1. Field of the Invention

The present invention generally relates to the construction of trailers for towing behind motor vehicles and, more particularly, is concerned with an improved trailer frame incorporating stabilized caster swivel and bounce motion dampening assemblies.

2. Description of the Prior Art

One common practice for transporting many different loads is to tow a load-carrying trailer behind a motor vehicle. As well-known in the prior art, such trailer typically includes a longitudinal frame mounting a load-carrying bed, enclosure or container and a pair of laterally-spaced ground-engaging wheels rotatably mounted to opposite ends of a transverse axle being attached to an undercarriage suspension arrangement which supports the frame. Also, such trailers usually have an elongated tongue rigidly attached to the forward end of the mobile frame. The front end of the tongue typically is pivotally connected about a vertical axis by a ball and socket hitch to the rear end of the towing motor vehicle to permit ease in turning the vehicle and trailer.

The prior art trailers having the construction described above usually function satisfactorily under normal weather and road conditions. However, in adverse weather and road conditions, such as strong wind currents and rough and uneven roads, trailers of such general construction experience difficulties. Because of the pivotal connection about the vertical axis between the trailer and towing vehicle, the trailer can develop an unstable and dangerous side-to-side swaying which oftentimes results in overturning of the trailer and damage to the towing vehicle unless the speed of the towing vehicle and trailer is slowed to an unacceptably low rate for normal highway traffic flow.

Trailers pivotally hitched about a horizontal axis to the rear of the towing vehicle and supported by a caster wheel having a swivel-type connection to the trailer frame have been attempted in the prior art. However the well-known tendency of swivel-type caster wheels to develop an unstable shimmy or oscillation at normal highway traffic speeds and the failure of any operable system to date to prevent this tendency has made a caster wheel supported trailer frame an unacceptable alternative to the above-described prior art trailer frame construction in current widespread use.

Consequently, a need still exists for improvement in trailer construction so as to overcome the above-described problems without introducing a new set of problems in their place.

SUMMARY OF THE INVENTION

The present invention provides an improved trailer frame designed to satisfy the aforementioned need. The functioning of the trailer frame in windy weather conditions and on rough and uneven road conditions is improved by incorporation of a stabilized caster swivel assembly in accordance with the present invention. The stabilized caster swivel assembly allows short turning of the caster wheel, forward or backwards, yet hydraulically resists any sharp or quick side movement. Also, the functioning of the trailer frame on undulating road conditions is improved by incorporation of a bounce motion dampening assembly in accordance with the present invention. Thus, the assemblies of the present invention improve the overall towability of trailers behind motor vehicles under adverse road and weather conditions.

Accordingly, the present invention is directed to a stabilized caster swivel assembly for a trailer. The caster swivel assembly comprises: (a) an elongated frame; (b) a swivel member mounted to said frame for rotation about a vertical axis; (c) a caster wheel mounted to the swivel member for rotation relative thereto about a horizontal axis and for rotation therewith about the vertical axis; (d) a cam member mounted to the swivel member for rotation therewith about the vertical axis; (e) a centering mechanism mounted on the frame for movement toward and away from the cam member and being biased toward the cam member to urge the cam member and caster wheel therewith to rotate toward a centered position aligned with a forward direction of travel, the centering mechanism being yieldable away from the cam member to permit the cam member and caster wheel therewith to rotate in either direction away from the centered position; (f) a hydraulic stabilizing mechanism mounted on the frame and interconnected to the swivel member; and (g) a hydraulic control circuit having a valve connected in flow communication with the hydraulic stabilizing mechanism and being actuatable between a first condition of restricted flow of hydraulic fluid between the control circuit and the hydraulic stabilizing mechanism for causing the hydraulic stabilizing mechanism to resist movement of the caster wheel in either direction away from the centered position and a second condition of unrestricted flow of hydraulic fluid between the control circuit and the hydraulic stabilizing mechanism for causing the hydraulic stabilizing mechanism to permit movement of the caster wheel in either direction away from the centered position.

More particularly, the cam member has a stabilizing recess formed therein facing in the forward direction of travel when the cam member and caster wheel are disposed at the centered position. The centering mechanism includes a slider member mounted to the frame forwardly of the cam member for sliding movement in a rearward direction toward and a forward direction away from the cam member, and a cam follower mounted to a rear end of the slider member and being matable with the recess on the cam member when the caster wheel is oriented relative to the centered position within predetermined maximum allowable angular limits in opposite directions from the centered position. The centering mechanism also includes means operable for biasing the slider member to cause movement thereof in the rearward direction toward the cam member so as to retain the cam follower in a mated relation with the recess on the cam member as long as the caster wheel remains within the maximum allowable angular limits relative to the centered position. The biasing means is also operable for allowing yielding of the slider member to permit movement thereof in the forward direction away from the cam member so as to remove the cam follower from the mated relation with the recess on the cam member upon the caster wheel pivoting away from the centered position beyond the maximum allowable angular limits relative thereto. The centering mechanism further includes means interconnecting the slider member with the valve of the hydraulic control circuit for actuating the valve from the first condition of restricted fluid flow to the second condition of unrestricted fluid flow in response to the movement the slider member in the forward direction away from the cam member as caused by pivoting of the caster wheel pivoting away from the centered position beyond the maximum angular limits relative thereto.

The hydraulic stabilizing mechanism includes a hydraulic actuator having a cylinder supported on the elongated frame and a piston mounted within a chamber of the cylinder for bi-directional sliding movement therein. The chamber of the cylinder and the hydraulic flow control circuit are filled with a hydraulic fluid. The flow control circuit is connected in flow communication with the chamber on opposite ends of the cylinder. The stabilizing mechanism also includes an elongated connecting rod extending between and pivotally connecting the piston with the swivel member.

The interconnecting means of the centering mechanism is a linkage extending between and connecting the slider member with the valve such that when the valve is at first condition of restricted flow of hydraulic fluid between the control circuit and the cylinder the hydraulic fluid in the cylinder resists movement of the piston and thereby, via the connecting rod, resists rotation of the caster wheel away from the centered position beyond the maximum allowable angular limits relative thereto. On the other hand, when the caster wheel has pivoted beyond the maximum allowable angular limits, the cam member has rotated sufficiently to unmate the cam follower from the recess on the cam member and move the slider member away from the cam member through a distance being sufficient to move the linkage and shift the valve from the first restricted flow condition to the second unrestricted flow condition permitting flow of hydraulic fluid through the fluid flow circuit and between the opposite ends of the cylinder chamber so as to permit sliding movement of the piston in the cylinder and thereby, via the connecting rod, continued rotation of the caster wheel through 180° beyond the centered position to facilitate movement of the frame in a reverse direction of travel.

The present invention also is directed to a bounce motion dampening assembly for transferring load from a leading vehicle to a trailing vehicle being towed by the leading vehicle. The bounce motion dampening assembly comprises: (a) resiliently expandable and contractable means, such as an elongated coil spring, disposable below the trailing vehicle and attached at a rear end to a frame of the trailing vehicle; (b) elongated support means, such as a pair of laterally spaced elongated tubes, disposable below the trailing and leading vehicles and pivotally mounted at a rear end to the frame of the trailing vehicle forwardly of the attachment of the rear end of the expandable and contractable means thereto, the support means extending forwardly along the expandable and contractable means; (c) means, such as a braking mechanism, disposed below the leading vehicle for mounting a plurality of tandemly-disposed rolls defining curved friction-generating surfaces and being supported at a front end of the support means; (d) an elongated flexible inelastic member, such as a length of belting, disposable below the leading vehicle and connected at a rear end to a front end of the expandable and contractable means and extending forwardly therefrom along a serpentine path between the rollers of the braking mechanism; and (e) means, such as a length of flexible inelastic cable, disposable below the leading vehicle for attaching the flexible inelastic member at a front end thereof to a frame of the leading vehicle towing the trailing vehicle such that the elongated expandable and contractable means and the length of elongated flexible inelastic member together function to transfer load from the leading to trailing vehicle so as to dampen forces generating a bounce-type movement of the vehicles.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

In General

Figure 1:
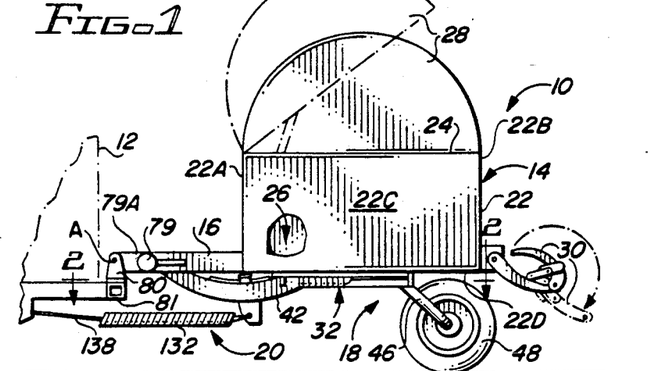
FIG. 1 is a side elevational view of a trailer having a cargo container supported upon a platform and incorporating a stabilized caster swivel assembly of the present invention and a bounce motion dampening assembly of the present invention being connected to the stabilized swivel assembly.

Referring to the drawings, and particularly to FIG. 1, there is illustrated a cargo trailer, generally designated 10, for towing behind another vehicle 12, such as a recreational vehicle, camper trailer or a pickup truck. The cargo trailer 10 has a cargo container 14 supported upon a generally planar platform 16. The cargo trailer incorporates a stabilized caster swivel assembly 18 of the present invention which supports the cargo container platform 16 and a bounce motion dampening assembly 20 of the present invention which is connected between the stabilized swivel assembly 18 and the towing vehicle 12.

The cargo container 14 has a large rectangular body 22 formed by four vertical front, rear and opposite side walls 22A, 22B, 22C connected with one another at vertical edges and a bottom wall 22D connected with lower edges of the vertical walls 22A, 22B, 22C. The body 22 thus has an open top 24 and is supported at its bottom wall 22D on the planar platform 16 of the trailer 10. The body 22 defines a large storage compartment 26 accessible through its open top 24. The cargo container 14 also has a semi-cylindrical top lid 28 pivotally mounted along an upper front edge of the front wall 22A of the container body 22 for movement between a lowered closed position, as shown in solid line form, and a raised opened position, as shown in dashed line form, relative to the open top 24 of the body 22.

Figures 2, 3, 4:
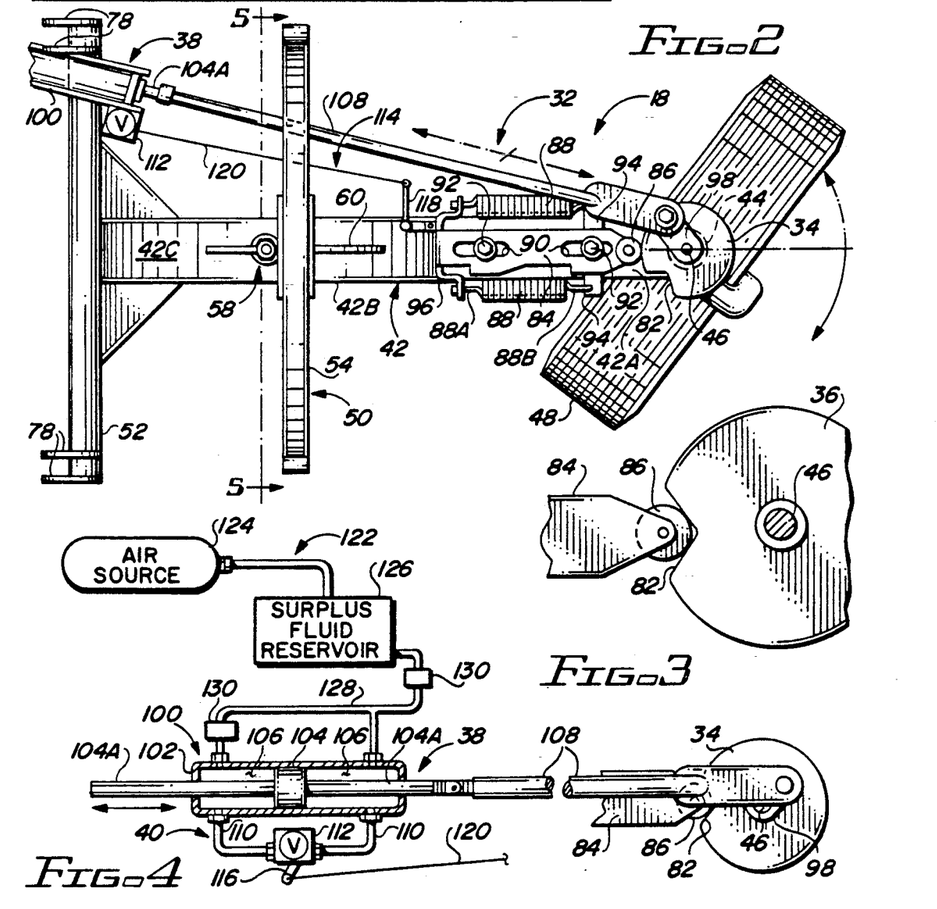
FIG. 2 is an enlarged top plan view of the stabilized caster swivel assembly as seen along line 2—2 of FIG. 1.
FIG. 3 is an enlarged fragmentary view of a cam member, slider member and cam follower of the stabilized caster swivel assembly of FIG. 2.
FIG. 4 is a diagrammatic top plan view, partly in section, of a hydraulic stabilizing mechanism, hydraulic fluid flow control circuit and a gas pressurized surplus fluid supply circuit of the stabilized caster swivel assembly of FIG. 2.
Figure 5:
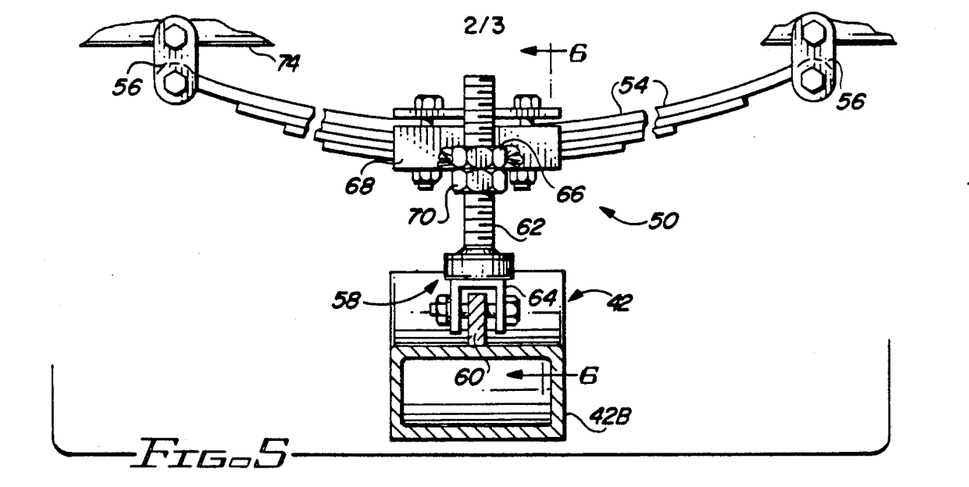
FIG. 5 is a front elevational view of an adjustable leaf spring support mechanism of the stabilized caster swivel assembly taken along line 5—5 of FIG. 2.

Referring to FIGS. 1 and 2, the planar platform 16 of the cargo trailer 10 is a generally flat rectangular rigid structure, being constructed of elongated rigidly tubing have a square cross-sectional shape. The platform 16 includes a pair of laterally-spaced, fore-and-aft extending, rectangular side portions 16A disposed at the opposite rear corners of the framework 16 and a single transversely-extending, rectangular front portion 16B rigidly connected to the forward ends of the side portions 16B. The cargo trailer 10 also includes a stairstep structure 30 mounted along the rear side portions 16A of the platform 16 for use by person to climb up to a suitable height at the rear of the cargo trailer 10 where it is easy to open and close the top lid 28 and to reach into cargo container storage compartment 26 through the open top 24 thereof. The stairstep structure 30 is pivotally movable between a lower deployed position, as shown in dashed line form, and an upper folded or stored position, as shown in solid line form.

Stabilized Caster Swivel Assembly

Referring to FIGS. 1 to 7, there is illustrated the stabilized caster swivel assembly 18 of the present invention. The stabilized caster swivel assembly 18 is attached to the planar platform 16 of the cargo trailer 10 and hitched at a forward end to the towing vehicle 12 for pivotal movement about a transverse horizontal axis A relative to the rear end of the towing vehicle 12. The stabilized caster swivel assembly 18 supports the planar platform 16 and the cargo container 14 therewith above a ground surface S over which it is towed by the towing vehicle 12. Basically, the stabilized caster swivel assembly 18 includes an elongated mobile frame 32, a cam member 34, a centering mechanism 36, a hydraulic stabilizing mechanism 38 and a hydraulic flow control circuit 40.

The elongated mobile frame 32 of the swivel assembly 22 includes a fore-and-aft extending frame member 42, an annular swivel mount 44 attached on a rear end portion 42A of the frame member 42, a swivel member 46 mounted to the swivel mount 44 for rotation about a vertical axis V, and a caster wheel 46 mounted to a lower portion of the swivel member 48 extending below the swivel mount 44 for rotation relative to the swivel member 46 about a horizontal axis H and for rotation with the swivel member 46 about the vertical axis V. The elongated frame 32 also includes a leaf spring support mechanism 50 mounted at a middle portion 42b of the frame member 42 for supporting a middle portion of the platform 16 of the trailer 10, and a transverse bar 52 attached across at a front portion 42C of the frame member 42 for supporting a front portion of the platform 16.

Referring to FIGS. 2 and 5 to 7, the leaf spring support mechanism 50 includes a stack of leaf springs 54, a pair of end links 56, and a position adjusting device 58 mounted to and extending between the leaf spring stack 54 and a flange 60 attached to and extending along the topside of the middle portion 42B of the frame member 42. The position adjusting device 58 includes an externally-threaded rod 62 having a clevis 64 on its lower end and being threaded into an internally-threaded nut 66 which, in turn, is attached to a clamp 68 used to retain the leaf spring 54 of the stack thereof together. Also, a locking nut 70 is threaded on the rod 62 for tightening against the nut 66 to present and maintain the nut 66 a desired distance above the flange 60. The flange 60 has a plurality of spaced holes 72 which define different longitudinally spaced mounting locations for connecting the clevis 64 to the flange 60. The opposite ends of the stack of leaf springs 54 are pivotally connected to and support an elongated cylindrical beam 74, via the end links 56 and a pair of collars 76. The beam 74 extends across and is attached at opposite ends to inner portions of the rectangular side portions 16A of the trailer platform 16.

Figures 6, 7:
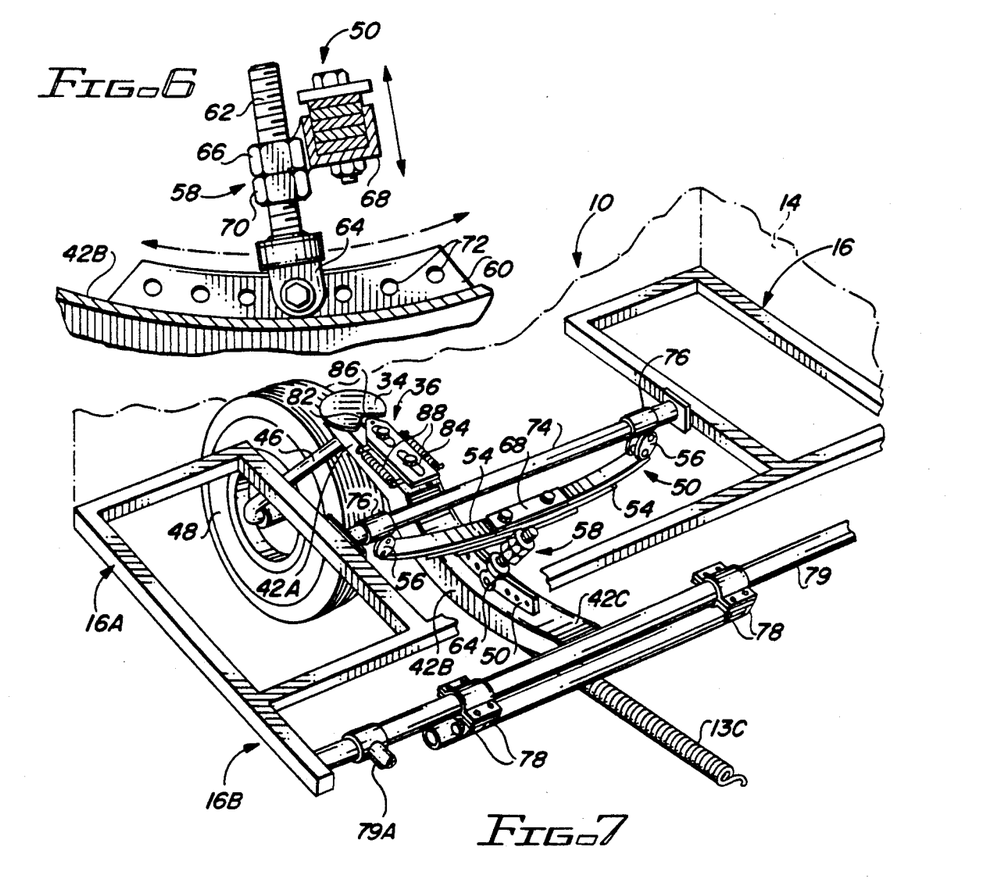
FIG. 6 is an enlarged fragmentary view of a position adjusting device of the leaf spring support mechanism as seen along line 6—6 of FIG. 5.
FIG. 7 is a perspective view of the cargo container platform of the trailer and the stabilized caster swivel assembly supporting the platform and of an elongated spring at a rearward portion of the bounce motion dampening assembly.

Referring to FIGS. 1, 2 and 7, the transverse bar 52 has pairs of spaced tabs 78 attached on and projecting forwardly and upwardly from the spaced opposite ends of the bar 52 for pivotally connecting and supporting another elongated cylindrical beam 79 which extends across and is part of the rectangular front portion 16B of the trailer platform 16. The beam 79 has a pair of connectors 79A mounted inwardly from its opposite ends for pivotally connecting to a pair of upstanding hitch pedestals 80 fixed on the rear bumper 81 of the towing vehicle 12.

Referring to FIGS. 2 to 4 and 7, the cam member 34 of the swivel assembly 18 is mounted to an upper portion of the swivel member 46 above the swivel mount 44 for rotation with the swivel member 46 and caster wheel 48 about the vertical axis V. Preferably, the cam member 34 is a flat rigid plate generally circular in configuration. The cam member 34 has a stabilizing notch or recess 82 formed in one peripheral edge portion thereof. The cam member 34 is oriented on the swivel member 46 such that the recess 82 faces in a forward direction of travel of the mobile frame 32 when the cam member 34 and caster wheel 48 are disposed at a centered position. Thus, in the centered position, the wheel 48 is aligned with the forward direction of travel of the trailer 10.

Referring again to FIGS. 2 to 4 and 7, the centering mechanism 36 of the swivel assembly 18 is seen mounted on the frame member 42 for movement toward and away from the cam member 34. The centering mechanism 36 includes a slider member 84, a cam follower 86, and biasing means in the form of a pair of coil springs 88. The slider member 84 has a pair of longitudinal slots 90 receiving a pair of bolts 92 attached on and projecting upwardly from the frame member 42 so as to mount the slider member 84 on the frame member 42 forwardly of the cam member 34 for sliding movement in a rearward direction toward and a forward direction away from the cam member 34. The cam follower 86 is rotatably mounted to a rear end of the slider member 84 and is matable with the stabilizing recess 82 on the cam member 34 when the caster wheel 48 is oriented relative to the centered position within a pair of predetermined maximum allowable angular limits, such as an angular displacement within the range of from ten to fifteen degrees, in opposite directions from the centered position. The pair of biasing springs 88 at their rear ends 88A are connected to a pair of ears 94 attached to the frame member 42 and projecting laterally therefrom. The biasing springs 88 at their front ends 88B are connected by a yoke 96 to the front end of the slider member 84. The biasing springs 88 tend toward their contracted state, being shown in FIG. 2, so as to cause movement of the slider member 84 in the rearward direction toward the cam member 34 and retention of the cam follower 86 in a mated relation with the recess 82 on the cam member 34 as long as the caster wheel 48 remains within the aforementioned maximum allowable angular limits relative to its centered position. On the other hand, the biasing springs 88 are yieldably expandable to allow movement of the slider member 84 in the forward direction away from the cam member 34 so as to remove the cam follower 86 from the mated relation with the recess 82 on the cam member 34 upon the caster wheel 48 pivoting away from the centered position beyond the maximum allowable angular limits relative thereto. Thus, the centering mechanism 36 is biased so as to move toward the cam member 34 for urging the cam member 34 and caster wheel 48 therewith to rotate toward a centered position aligned with a forward direction of travel. However, the centering mechanism 36 is yieldable so as to move away from the cam member 34 as the cam member 34 and caster wheel 48 therewith to rotate in either direction away from the centered position.

Referring to FIGS. 2 and 4, the hydraulic stabilizing mechanism 38 of the swivel assembly 18 is mounted on the transverse bar 52 of the mobile frame 32 and is interconnected to swivel member 46 by a crank arm 98. The hydraulic stabilizing mechanism 38 includes a hydraulic actuator 100 having a cylinder 102 supported on the transverse bar 52 of the frame 32 and a piston 104 mounted within a hollow interior chamber 106 of the cylinder 102 for bi-directional sliding movement therein by opposite end portions of a piston rod 104A extending from opposite ends of the cylinder 102. The stabilizing mechanism 38 also includes an elongated connecting rod 108 extending between and pivotally interconnecting one end portion of the piston rod 104A with the crank arm 98 connected to the upper end of the swivel member 46. The chamber 106 of the cylinder and the hydraulic flow control circuit 40 define a closed circuit which is filled with a suitable hydraulic fluid.

Referring to FIGS. 2 and 4, the hydraulic flow control circuit 40 of the swivel assembly 18 includes a tubular conduit 110 connected in flow communication with the chamber 106 on opposite ends of the cylinder 102 and a control valve 112 interposed in the conduit 110 in flow communication with the cylinder chamber 106 of the stabilizing mechanism 38. The control valve 112 is preadjusted so as to be actuatable between first and second conditions. In the first actuated condition of the valve 112, very limited, restricted flow of hydraulic fluid is allowed to take place through the valve 112 between the control circuit 40 and the stabilizing mechanism 38, and thus between the opposite ends of the chamber 106, for causing the stabilizing mechanism 38 to substantially resist any sudden movement of the caster wheel 48 in either direction away from the centered position (but allow gradual turning movement of the caster wheel 48 as would be the case in normal road travel such as rounding corners and curves). In the second actuated condition of the valve 112, substantially unrestricted flow of hydraulic fluid is allowed to take place through the valve 112 between the control circuit 40 and the stabilizing mechanism 38, and thus the opposite ends of the chamber 106, for causing the stabilizing mechanism 38 to permit movement of the caster wheel 48 in either direction away from the centered position.

Referring to FIGS. 2 and 4, the centering mechanism 36 also includes a linkage 114 made up of a pivotal lever arm 116 on the valve 112, a pivotal crank arm 118 on the frame member 42 and a rod 120 interconnecting them. The linkage 114 extends between and connects the slider member 84 with the valve 112 of the hydraulic control circuit 40 for actuating the valve 112 from the first condition of limited or restricted fluid flow to the second condition of unrestricted fluid flow in response to movement of the slider member 84 in the forward direction away from the cam member 34 as caused by rotating of the caster wheel 48 pivoting away from the centered position and beyond the maximum allowable angular limits relative thereto. Therefore, when the valve 112 is at the first condition of restricted flow of hydraulic fluid between the control circuit 40 and the cylinder 102, the hydraulic fluid in the cylinder 102 cannot circulate in the closed circuit at a fast enough rate and so resists movement of the piston 104 through the fluid in the chamber 106 and thereby, via the connecting rod 108, resists rapid or sudden rotating of the caster wheel 48 away from the centered position beyond the maximum allowable angular limits relative thereto. On the other hand, when the caster wheel 48 has gradually rotated beyond the maximum allowable angular limits, the cam member 34 will be rotated with it by a sufficient amount to unmate the cam follower 86 from the stabilizing recess 82 on the cam member 34 and move the slider member away from the cam member 34 through a distance sufficient to move the linkage 114 and shift the valve 112 from the first restricted flow condition to the second unrestricted flow condition. This will permit flow of fluid more rapidly through the fluid flow circuit 40 and between the opposite ends of cylinder chamber 106 so as to permit faster sliding movement of the piston 104 in the cylinder 102 and thereby, via the connecting rod 108, continued rotating of the caster wheel 48 through 180° beyond the centered position to facilitate backing movement of the frame 32 in a reverse direction of travel.

Finally, the swivel assembly 18 includes a gas-pressurized surplus hydraulic fluid supply circuit 122 connected to the opposite portions of the cylinder 102 of the hydraulic stabilizing mechanism 38. The gas-pressurized surplus hydraulic fluid supply circuit is provided to replace any fluid losses in the closed hydraulic system of the stabilizing mechanism 38 and fluid flow control circuit 40. The pressurized gas for the circuit 40 is preferably provided by a suitable air source 124 built into a hollow portion of the frame 32. The circuit 122 has a surplus hydraulic fluid reservoir 126 which is connected by a conduit 128 and flow restrictors 130 to the opposite ends of the cylinder 102 of the hydraulic actuator 100. The pressurized gas must maintain a static pressure in the hydraulic fluid in the surplus fluid reservoir 126 and thereby in the cylinder chamber 106 which is sufficient to equal the induced pressure normally needed for the piston 104 and fluid-sealing glands (not shown) around the piston rod 104A to function properly. The surplus hydraulic fluid reservoir 126 is located in such manner that any gas used in pressurization will be forced by gravity to be trapped in the reservoir. The flow of fluid in and out of the surplus fluid reservoir 126 to and from the cylinder 102 is held to very minimal amounts by the flow restrictors 130.

Bounce Dampening Assembly

Referring to FIGS. 1 and 7 to 9, there is shown the bounce motion dampening assembly 20 of the present invention. The bounce motion dampening assembly 20 is used when the trailer 10 is pulled by another towed vehicle, such as camper, in order to transfer weight from the leading vehicle, the camper, to the trailing vehicle, namely, to the caster wheel 48 of the trailer swivel assembly 18 of the trailer 10 so as to dampen forces generating a bounce-type movement of the vehicles. Basically, the bounce motion dampening assembly 20 includes a resiliently expandable and contractable member in the form of an elongated coil spring 132, an elongated supporting means in the form of a pair of elongated support tubes 134, a braking mechanism 136, an elongated inelastic flexible member in the form of a length of belting 138, and an attaching means in the form of a length of inelastic flexible cable 140.

More particularly, the elongated resiliently expandable and contractable coil spring 132 of the dampening assembly 20 is disposed below the frame member 42 of the stabilized swivel assembly 18 of the trailer 10 and extends below the leading vehicle 12 which tows the trailer 10. The coil spring 132 is attached at a rear end to the middle portion 42B of the frame member 42 and is spaced below the pivotal connection A between the trailer platform 16 and bumper hitches 80.

Figure 8:
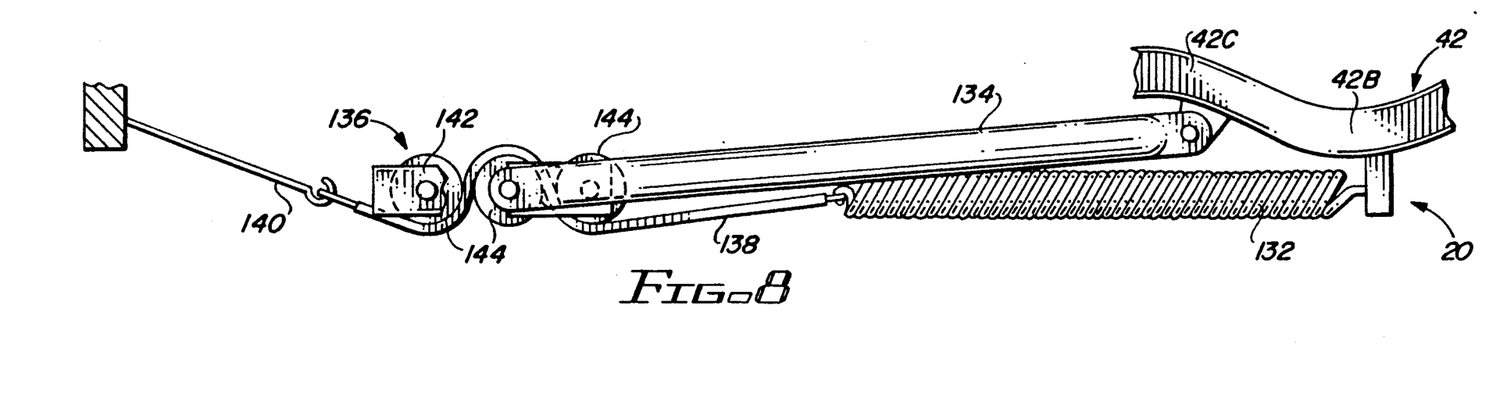
FIG. 8 is a longitudinal view, with parts broken away, of a bounce motion dampening assembly of the present invention.
Figure 9:
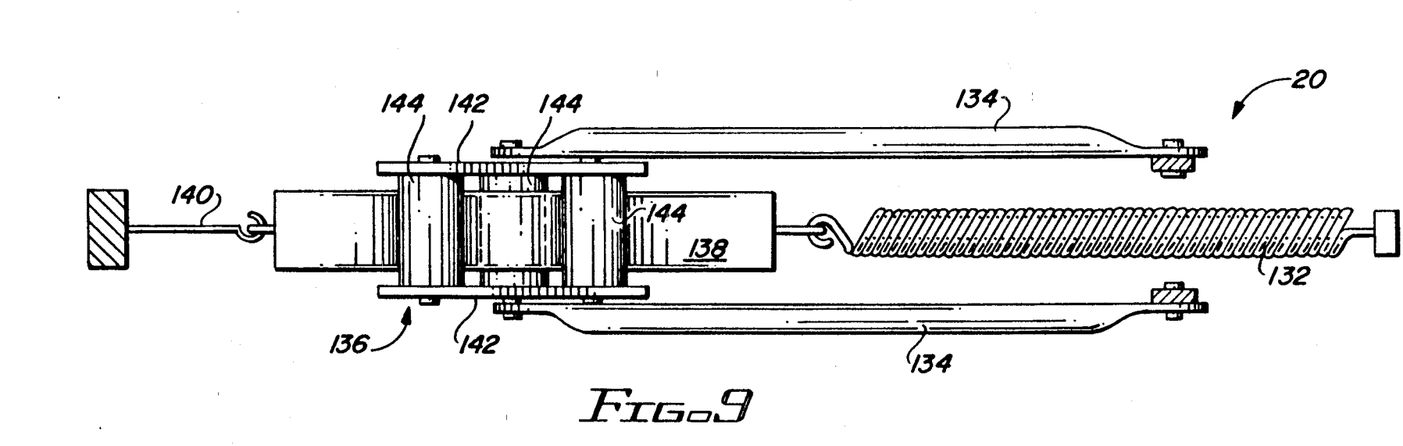
FIG. 9 is a top plan view of the bounce motion dampening assembly of FIG. 8.

The pair of elongated parallel support tubes 134 of the dampening assembly 20 are disposed below the mobile frame 32 and the towing vehicle 12 and are pivotally mounted at rear ends to the forward end portion 42C of the frame member 42 of the swivel assembly 18 and forwardly of the attachment of the rear end of the coil spring 132 to the middle portion 42B thereof. The support tubes 134 extend forwardly therefrom with the elongated coil spring 132 disposed between the tubes 134.

The braking mechanism 136 of the dampening assembly 10 is disposed below the towing vehicle 12 and includes a pair of elongated plate-like side members 142 and a plurality of cylindrical rolls 144. The side members 142 are pivotally mounted at rear ends between front ends of the elongated tubes 134. The side members 142 are spaced laterally from one another and extend forwardly from the tubes 134. The rolls 144 are disposed in tandemly spaced relation to one another and mounted in a fixed relation between the side members 142 and extend in generally parallel relation to each other. The rolls 144 define curved or arcuate surfaces about their exteriors.

The length of elongated flexible inelastic belting 138 of the dampening assembly 20 is disposed below the towing vehicle 12 and is connected at a rear end to a front end of the elongated coil spring 132. The length of belting 138 extends forwardly between the elongated tubes 134 from the coil spring 132 along a serpentine path, namely, over, between and under the rolls 144 of the braking mechanism 136. The sliding contact between the belting 138 and curved surfaces of the rolls 144 generates sufficient friction to slow the extension and contraction of the spring 132.

The length of flexible inelastic cable 140, or other suitable attachment device, of the dampening assembly 20 is disposed below the towing vehicle 12 and is attached at a rear end to a front end of the length of belting 138 forwardly of the braking mechanism 136. The length of cable 140, in turn, is attached to a portion of the frame of the towing vehicle 12. In such arrangement, by being located below the hitch connection A of the trailer platform 16 to the bumper 81, the elongated coil spring 132, the length of belting 138, and the braking mechanism 136 together function to transfer load from the towing vehicle 12 to the towed mobile frame 32 so as to dampen forces generating a bounce-type movement of the vehicles.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A stabilized caster swivel assembly for a trailer, comprising:
    (a) an elongated frame;
    (b) a swivel member mounted to said frame for rotation about a vertical axis;
    (c) a caster wheel mounted to said swivel member for rotation relative thereto about a horizontal axis and for rotation therewith about said vertical axis;
    (d) a cam member mounted to said swivel member for rotation therewith about said vertical axis;
    (e) a centering mechanism mounted on said frame for movement toward and away from said cam member and being biased toward said cam member for urging said cam member and caster wheel therewith to rotate toward a centered position aligned with a forward direction of travel, said centering mechanism being yieldable away from said cam member for permitting said cam member and caster wheel therewith to rotate in either direction away from said centered position;
    (f) a stabilizing mechanism mounted on said frame and interconnected to said swivel member; and
    (g) a control circuit having a valve connected in flow communication with said stabilizing mechanism and being actuatable between a first condition of restricted flow of fluid between said control circuit and said stabilizing mechanism for causing said stabilizing mechanism to resist rotational movement of said caster wheel in either direction away from said centered position and a second condition of unrestricted flow of fluid between said control circuit and said stabilizing mechanism for causing said stabilizing mechanism to permit rotation movement of said caster wheel in either direction away from said centered position.

2. The swivel assembly of claim 1 wherein said cam member has a stabilizing recess formed therein facing in the forward direction of travel when said cam member and caster wheel are disposed at said centered position.

3. The swivel assembly of claim 2 wherein said centering mechanism includes:
    a slider member mounted to said frame forwardly of said cam member for sliding movement in a rearward direction toward and a forward direction away from said cam member;
    a cam follower mounted to a rear end of said slider member and being matable with said recess on said cam member when said caster wheel is oriented relative to said centered position within predetermined maximum allowable angular limits in opposite directions from said centered position; and means for biasing said slider member to cause movement thereof in the rearward direction toward said cam member so as to retain said cam follower in a mated relation with said recess on said cam member as long as said caster wheel remains within said maximum allowable angular limits relative to said centered position, said biasing means for allowing yielding of said slider member to permit movement thereof in the forward direction away from said cam member so as to remove said cam follower from said mated relation with said recess on said cam member upon said caster wheel rotating away from said centered position beyond said maximum allowable angular limits relative thereto.

4. The swivel assembly of claim 3 wherein said centering mechanism also includes means interconnecting said slider member and said valve of said control circuit for actuating said valve from said first condition of restricted fluid flow to said second condition of unrestricted fluid flow in response to the movement said slider member in the forward direction away from said cam member as caused by rotating of said caster wheel away from said centered position beyond said maximum allowable angular limits relative thereto.

5. The swivel assembly of claim 4 wherein said stabilizing mechanism includes:
   a hydraulic actuator having a cylinder supported on said elongated frame and a piston mounted within a chamber of said cylinder for bi-directional sliding movement therein, said chamber of said cylinder and said flow control circuit being filled with a hydraulic fluid, said flow control circuit being connected in flow communication with said chamber on opposite ends of said cylinder; and
   an elongated connecting rod extending between and pivotally interconnecting said piston with said swivel member.

6. The swivel assembly of claim 5 wherein said interconnecting means of said centering mechanism is a linkage extending between and connecting said slider member with said valve such that when said valve is at said first condition of restricted flow of hydraulic fluid between said control circuit and said cylinder the hydraulic fluid in said cylinder resists movement of said piston and thereby, via said connecting rod, resists rotation of said caster wheel away from said centered position beyond said maximum allowable angular limits relative thereto, whereas when said caster wheel has rotated beyond said maximum allowable angular limits said cam member has rotated sufficiently to unmate said cam follower from said recess on said cam member and move said slider member away from said cam member through a distance being sufficient to move said linkage and shift said valve from said first restricted flow condition to said second unrestricted flow condition permitting flow of fluid through said fluid flow circuit and between said opposite ends of said cylinder chamber so as to permit sliding movement of said piston in said cylinder and thereby, via said connecting rod, continued rotating of said caster wheel through 180° beyond said centered position to facilitate movement of said frame in a reverse direction of travel.

7. The swivel assembly of claim 1 wherein said elongated frame includes:

a fore-and-aft frame member having a swivel mount attached at a rear portion thereof, said swivel mount mounting said swivel member for movement about said vertical axis;

first means mounted at a middle portion of said frame member for supporting a middle portion of a cargo container platform of the trailer; and second means for supporting a front portion of the cargo container platform of the trailer.

8. The swivel assembly of claim 7 wherein said first supporting means is a leaf spring support mechanism pivotally mounted at said middle portion of said frame member and having laterally-spaced upper ends for supporting the trailer platform.

9. The swivel assembly of claim 8 wherein said elongated frame also includes a flange attached to and extending along said middle portion of said frame member, said flange defining a plurality of longitudinally spaced mounting locations for said leaf spring support mechanism on said frame member.

10. The swivel assembly of claim 7 wherein said second supporting means is a transverse bar attached across at a front portion of said frame member and having spaced opposite ends for supporting the trailer platform.

11. The swivel assembly of claim 10 wherein said stabilizing mechanism includes:
   a hydraulic actuator having a cylinder supported on said front transverse bar of said frame member and a piston mounted within a chamber of said cylinder for bi-directional sliding movement therein, said chamber of said cylinder and said flow control circuit being filled with a hydraulic fluid, said flow control circuit being connected in flow communication with said chamber on opposite ends of said cylinder; and
   an elongated connecting rod extending between and pivotally interconnecting said piston with said swivel member such that when said valve is at said first condition of restricted flow of hydraulic fluid between said control circuit and said cylinder the hydraulic fluid in said cylinder resists movement of said piston and thereby, via said connecting rod, resists rotating of said caster wheel away from said centered position beyond said maximum allowable angular limits relative thereto, whereas when said caster wheel has rotated beyond said maximum allowable angular limits said valve is shifted from said first restricted flow condition to said second unrestricted flow condition permitting flow of fluid through said fluid flow circuit and between said opposite ends of said cylinder chamber so as to permit sliding movement of said piston in said cylinder and thereby, via said connecting rod, continued rotating of said caster wheel through 180° beyond said centered position to facilitate movement of said frame in a reverse direction of travel.

12. The assembly of claim 11 further comprising:
   a gas-pressurized surplus fluid supply circuit connected to said opposite ends of said cylinder for replacing any fluid losses due to leakage.

13. A stabilized caster swivel assembly for a trailer, comprising:
   (a) an elongated frame having a swivel mount attached on a rear portion thereof;
   (b) a swivel member mounted to said swivel mount for rotation about a vertical axis;

(c) a caster wheel mounted to a lower portion of said swivel member below said swivel mount for rotation relative to said swivel member about a horizontal axis and for rotation with said swivel member about said vertical axis;

(d) a cam member mounted to an upper portion of said swivel member above said swivel mount for rotation with said swivel member and caster wheel about said vertical axis, said cam member having a stabilizing recess formed therein facing in a forward direction of travel of said frame when said cam member, and caster wheel are disposed at a centered position aligned with the forward direction of travel;

(e) a centering mechanism mounted on said frame forwardly of said cam member for movement toward and away from said cam member, said centering mechanism being biased toward said cam member for engaging said recess and urging said cam member and caster wheel therewith to rotate toward said centered position, said centering mechanism being yieldable away from said cam member for disengaging from said recess and permitting said cam member and caster wheel therewith to rotate in either direction away from said centered position;

(f) a stabilizing mechanism said frame forwardly of and interconnected to said swivel member; and (g) a control circuit having a valve connected in flow communication with said stabilizing mechanism and being actuatable between a first condition of restricted flow of fluid between said control circuit and stabilizing mechanism for causing said stabilizing mechanism to resist movement of said caster wheel in either direction away from said centered position and a second condition of unrestricted flow of fluid between said control circuit and said stabilizing mechanism for causing said stabilizing mechanism to permit movement of said caster wheel in either direction away from said centered position and away from the forward direction of travel of said frame.

14. The swivel assembly of claim 13 wherein said centering mechanism includes:

a slider member mounted to said frame said cam member for sliding movement in a rearward direction toward and a forward direction away from said cam member;

a cam follower mounted to a rear end of said slider member and being seatable within said recess on said cam member when said caster wheel is oriented relative to said centered position within predetermined maximum angular limits in opposite directions from said centered position; and means for biasing said slider member to cause movement thereof in the rearward direction toward said cam member so as to retain said cam follower in a mated relation with said recess on said cam member as long as said caster wheel remains within said maximum allowable angular limits relative to said centered position, said biasing means for allowing yielding of said slider member to permit movement thereof in the forward direction away from said cam member so as to remove said cam follower from said mated relation with said recess on said cam member upon said caster wheel rotating away from said centered position beyond said maximum angular limits relative thereto.

15. The swivel assembly of claim 14 wherein said stabilizing mechanism includes:

a hydraulic actuator having a cylinder supported on said elongated frame and a piston mounted within a chamber of said cylinder for bi-directional sliding movement therein, said chamber of said cylinder and said flow control circuit being filled with a hydraulic fluid, said flow control circuit being connected in flow communication with said chamber on opposite ends of said cylinder; and an elongated connecting rod extending between and pivotally interconnecting said piston with said swivel member.

16. The swivel assembly of claim 15 wherein said interconnecting means of said centering mechanism is a linkage extending between and connecting said slider member with said valve such that when said valve is at said first condition of restricted flow of hydraulic fluid between said control circuit and said cylinder the hydraulic fluid in said cylinder resists movement of said piston and thereby, via said connecting rod, resists rotating of said caster wheel away from said centered position beyond said maximum allowable angular limits relative thereto, whereas when said caster wheel has rotated beyond said maximum allowable angular limits said cam member has rotated sufficiently to unmate said cam follower from said stabilizing recess on said cam member and move said slider member away from said cam member through a distance being sufficient to move said linkage and shift said valve from said first restricted flow condition to said second restricted flow condition permitting flow of fluid through said fluid flow circuit and between said opposite ends of said cylinder chamber so as to permit sliding movement of said piston in said cylinder and thereby, via said connecting rod, continued rotating of said caster wheel through 180° beyond said centered position to facilitate movement of said frame in a reverse direction of travel.

* * * * *